United States Patent [19]

Hess et al.

[11] Patent Number: 4,918,317

[45] Date of Patent: Apr. 17, 1990

[54] RADIATION DOSIMETER

[75] Inventors: Todd M. Hess, Columbus; Peter Gottschalk, Centerville, both of Ohio

[73] Assignee: The Mead Corporation, Dayton, Ohio

[21] Appl. No.: 285,335

[22] Filed: Dec. 14, 1988

Related U.S. Application Data

[63] Continuation of Ser. No. 69,357, Jul. 2, 1987, abandoned.

[51] Int. Cl.$^4$ ............................................. G01T 1/02
[52] U.S. Cl. ................................. 250/474.1; 430/138
[58] Field of Search ............... 250/474.1, 473.1, 472.1; 430/138

[56] References Cited

U.S. PATENT DOCUMENTS

| | | | |
|---|---|---|---|
| 2,730,456 | 1/1956 | Green et al. | 503/214 |
| 2,800,457 | 7/1957 | Green et al. | 428/402.2 |
| 2,953,454 | 9/1960 | Berman | 430/345 |
| 3,710,109 | 1/1973 | Chalkley | 250/474.1 |
| 3,732,119 | 5/1973 | Churchill et al. | 428/1 |
| 3,755,190 | 8/1973 | Hart et al. | 427/213.34 |
| 3,796,669 | 3/1974 | Kiritani et al. | 428/402.21 |
| 3,914,511 | 10/1975 | Vassiliades | 503/206 |
| 4,001,140 | 1/1977 | Foris et al. | 427/213.34 |
| 4,006,023 | 2/1977 | McLaughlin et al. | 430/338 |
| 4,025,455 | 5/1977 | Shackle | 428/402.21 |
| 4,087,376 | 5/1978 | Foris et al. | 427/213.34 |
| 4,089,802 | 5/1978 | Foris et al. | 427/213.34 |
| 4,377,751 | 3/1983 | Kronenberg et al. | 250/474.1 |
| 4,399,209 | 8/1983 | Sanders et al. | 430/138 |
| 4,454,421 | 6/1984 | Tanaka et al. | 250/336.1 |
| 4,466,941 | 8/1984 | Cerami et al. | 422/57 |
| 4,489,240 | 12/1984 | Kronenberg et al. | 250/474.1 |
| 4,507,226 | 3/1985 | Noakes et al. | 252/600 |
| 4,602,425 | 7/1986 | Kronenberg | 29/600 |
| 4,631,414 | 12/1986 | Kronenberg et al. | 250/474.1 |
| 4,788,126 | 11/1988 | Feldman et al. | 430/138 |

*Primary Examiner*—Constantine Hannaher
*Attorney, Agent, or Firm*—Thompson, Hine and Flory

[57] ABSTRACT

The present invention provides a radiation dosimeter comprising a support having a layer of microcapsules on the surface thereof. The microcapsules comprise a wall and an internal phase of a solution of a radiochromic dye. Upon exposure to radiation, the radiochromic dye changes color or shade plus density. The radiation dosimeter can be supplied in large as well as small formats.

15 Claims, No Drawings

RADIATION DOSIMETER

This is a continuation Application of co-pending application Ser. No. 069,357, filed July 2, 1987.

BACKGROUND OF THE INVENTION

The present invention relates to radiation dosimeters, and more particularly, to radiation dosimeters comprising microencapsulated radiochromic dyes.

Radiation, especially gamma and electron beam, is now widely used in industry. For example, gamma radiation is used in the food industry as a means for killing bacteria and preserving food. It is used in the pharmaceutical industry as a means for sterilizing pharmaceuticals and in the hospital supply industry as a means for sterilizing surgical gloves, surgical drapes, and the like.

Because radiochromic dyes change color or shade plus density upon exposure to radiation, they have been used in radiation dosimeters to determine the amount of radiation which has been received in a given environment. These dyes are gelatinous in nature and they are typically containerized within plastic tubing as disclosed in U.S. Pat. Nos. 4,377,751; 4,489,240; 4,507,226; and 4,602,425; within plastic blocks as disclosed in U.S. Pat. No. 4,631,414; or within glass ampoules as disclosed in U.S. Pat. Nos. 3,710,109 and 4,507,226. U.S. Pat. No. 4,006,023 teaches a dosimeter comprising a vinyl or acrylic polymer having a dye cyanide dispersed therein.

With the increased industrial use of radiation, a need has arisen for a radiation dosimeter which is less expensive and more convenient to use. Also, because currently available radiation dosimeters measure radiation over a small area, a need exists for a radiation dosimeter which can be used in large as well as small formats.

SUMMARY OF THE INVENTION

The present invention provides a radiation dosimeter comprising a support having a layer of microcapsules on the surface thereof. The microcapsules comprise a wall and an internal phase of a solution of a radiochromic dye. As those skilled in the art know, radiochromic dyes change color or shade plus density upon exposure to radiation such as alpha, beta, and gamma radiation; electron beam radiation; x-ray; and ultraviolet radiation.

The present invention includes both digital-type dosimeters in which radiation above a certain threshold amount causes a color or density change and analog-type dosimeters from which the amount of radiation can be determined quantitatively.

In contrast to current dosimeters, the radiation dosimeter of the present invention can be supplied in large as well as small formats. Prior to the present invention, numerous ampoule-type or plastic tubing-type dosimeters had to be placed over a given area in order to properly measure the amount of radiation received by the given area. The radiation dosimeter of the present invention is useful because it can be supplied in the form of single sheets or rolls. Further, the single sheets can be cut to the size required. Depending upon the application, a single sheet can be placed over a given area or a web can be rolled over an area where the radiation received is to be measured. As such, the radiation dosimeter of the present invention is more convenient to use than current dosimeters employing radiochromic dyes while maintaining the accuracy and reliability of current dosimeters in making radiation dose determinations. Further, microencapsulation of radiochromic dyes to produce a radiation dosimeter is less expensive than ampoule or plastic tubing encapsulation of radiochromic dyes.

The present invention also provides a process for detecting and/or measuring radiation. The foregoing radiation dosimeter which comprises a support having a layer of microcapsules on the surface thereof wherein the microcapsules comprise a wall and an internal phase of a solution of radiochromic dyes is exposed to radiation. The radiochromic dyes change color or shade plus density upon exposure to radiation. The color, shade, or density, as viewed through the microcapsule side of the dosimeter or through the support side of the dosimeter if the support is transparent, is then compared with a standard, reference, or comparison scale which is supplied with the dosimeter to determine the amount of radiation received. The amount of radiation received can also be determined by a spectrophotometer or a densitometer. In this regard, it is noted that reference to determining the amount of exposure is intended to encompass both digital dosimeters inwhich the determination is simply that a threshold has been exceeded as well as analog dosimeters in which the determination yields the quantity of radiation.

Thus, an object of the present invention is to provide a radiation dosimeter which is available in large as well as small formats, which is inexpensive, and which is convenient to use.

An additional object of the present invention is to provide digital-type and analog-type dosimeters.

A further object of the present invention is to provide a radiation dosimeter which is exposed to radiation and the amount of radiation received is determined by a spectrophotometer or a densitometer.

A more particular object of the present invention is to provide a radiation dosimeter which provides an accurate and reliable means of making radiation dose determinations.

Other objects and advantages of the present invention will become apparent from the following description and appended claims.

DETAILED DESCRIPTION OF THE INVENTION

Any radiochromic dye can be used in the radiation dosimeter of the present invention. Examples of useful radiochromic dyes include dye cyanides such as 4,4',4''-triamino-triphenylacetonitrile;
4,4',4''-triamino-3,3'3''-trimethyl-triphenylacetonitrile;
4,4'-bis-dimethylamino-triphenylacetonitrile;
4,4'-bis-diethylamino-triphenylacetonitrile;
4,4',4''-tris-dimethylamino-triphenylacetonitrile;
4,4',4''-trihydroxytriphenylacetonitrile; and
4,4'-bis-dimethylaminotriphenylacetonitrile-4''-sulfonic acid.

Other examples of useful dye cyanides are pararosaniline cyanide; hexa(hydroxyethyl) pararosaniline cyanide; new fuchsin cyanide; crystal violet cyanide; malachite green cyanide; brilliant blue cyanide; methyl green cyanide; helvetia green cyanide; and seto-glaucine cyanide. Most of the foregoing dye cyanides are available from Far West Technologies.

To form the internal phase of the microcapsules, solutions of the radiochromic dyes in a photo-activating solvent are prepared. The solvent should be colorless so that the amount of radiation received can be determined either visually or instrumentally based on the color change in the radiochromic dye.

Preferably, a polar solvent is used. High polarity solvents facilitate dissolving greater amounts of dye therein. Also, high polarity solvents seem to enhance the sensitivity of the dye in the color change reaction.

The solvents should remain liquid down to at least about 20° C. and should not boil or vaporize at temperatures below about 80° C. The solvents should be composed of light elements such as carbon, hydrogen, and oxygen and should be relatively free of elements having atomic numbers greater than 17 which might impair sensitivity.

Examples of useful solvents are water; ethyl alcohol; methyl alcohol; i-propyl alcohol; formamide; dimethyl formamide; diethyl formamide; dimethyl acetamide; N,N-dimethyl formamide; N,N-diethyl formamide; N,N-dimethylacetamides; 2-methoxy ethanol; 2-ethoxy ethanol; triethyl phosphate; tributyl phosphate; trioctyl phosphate; trichloroethyl phospaate; dimethyl sulfoxide; ethylene glycol; propylene glycol; acetic acid; 2-chloro ethanol; and vinyl pyrollidone. Preferably, because of current microencapsulation methodology, the solvent should be water insoluble.

Other examples of useful solvents are polyoxy compounds containing at least one ether group such as ethylene glycol monomethyl ether; ethylene glycol monoethyl ether; ethylene glycol diethyl ether; and tetraethylene glycol dimethyl ether.

The concentration of the dye in the solvent should be from about 3 to 20 percent by weight, and preferably, about 10 to 15 percent by weight, which in most instances is approaching or about the saturation concentration of the dye. Preferably, relatively high concentrations of dye are used in the polar solvent.

The dyes are dissolved in the solvent by conventional means. For example, the powdered dye can be poured into a beaker of solvent and the beaker subjected to ultrasonic vibration until all of the dye has dissolved in the solvent.

After the dye has been dissolved in the solvent, small amounts of acid can be added to the solution. The acid proves beneficial in enhancing the color-forming abitlity of the dye and its stability in solution. The acid stabilizes the dye so that it does not revert back to the clear, colorless form. When a solution of radiochromic dyes goes from clear to color upon exposure to radiation, the solution loses some of its acidity. One purpose of the acid addition is to ensure that the solution remains acidic and that some acid groups are available for reaction with the dyes so that the color change is stabilized.

To assure permanency of the color change, about 1% acid is added to the solution to make the solution slightly acidic with a pH of about 5 to 7. Useful acids are acetic acid; arachidic acid; barbituric acid; boric acid; cinnamic acid; citric acid; coumalic acid; cyanoacetic acid; maleic acid; phosphoric acid; phthalic acid; salicylic acid; styrylacetic acid; and tartaric acid. The acids should dissolve in the solvent in which they are employed and should be subsequently free of water.

The internal phase of radiochromic dye in solvent is encapsulated in a conventional manner. Microencapsulation has been accomplished by a wide variety of known techniques including coacervation, interfacial polymerization, polymerization of one or more monomers in an oil, as well as various melting, dispersing, and cooling methods.

Many known wall-forming materials are useful for encapsulation of the internal phase of the present invention. Examples of useful wall-forming materials are gelatin wall-forming materials (see U.S. Pat. Nos. 2,730,456 and 2,800,457 to Green et al.) including gum arabic, polyvinyl alcohol, carboxymethylcellulose; resorcinol-formaldehyde wall formers (see U.S. Pat. No. 3,755,190 to Hart et al.); isocyanate wall-formers (see U.S. Pat. No. 3,914,511 to Vassiliades); isocyanate-polyol wall-formers (see U.S. Pat. No. 3,796,669 to Kiritani et al); urea-formaldehyde wall-formers, and more particularly, urea-resorcinol-formaldehyde (in which oleophilicity is enhanced by the addition of resorcinal) (see U.S. Pat. Nos. 4,001,140; 4,087,376; and 4,089,802 to Foris et al); melamine-formaldehyde resin and hydroxypropyl cellulose (see commonly assigned U.S. Pat. No. 4,025,455 to Shackle). To the extent necessary for complete disclosure of these wall-forming materials, the above mentioned patents are specifically incorporated by reference. Typically the microcapsules range from about 5 to 30 microns in size.

The formed capsule wall must be transmissive to exposure radiation. Preferably, the wall-forming material is melamine-formaldehyde or urea-formaldehyde.

Once the microcapsules are formed, the microcapsules can be combined with a binder. A wide variety of suitable binders exists. Examples of useful binders are gelatin, polyvinyl alcohol, polyacrylamide, and acrylic latices.

The coating composition of microcapsules and binder is applied to a continuous web of paper and dried. Any ordinary coating or printing technique can be used in making the radiation dosimeters in accordance with the present invention including such means as roller or blade coating.

The coating composition is applied to a support such as paper. The paper may be a commercial impact raw stock or a special grade paper such as clay-coated paper. As will be discussed later, a transparent support is used when a spectophotometer is used to determine the amount of radiation received. A useful transparent support is polyethylene terephthalate.

As discussed earlier, the radiation dosimeter can be supplied in roll form when large formats are desired. The radiation dosimeter can also be supplied in roll form with a shorter width by cutting the radiation dosimeter material along its length with a pair of opposed circular knives. Such knives rotate at an angle to one another so as to produce a scissoring action between them which cuts the radiation dosimeter material. The radiation dosimeter can be supplied in still smaller formats by cutting as desired.

Radiochromic solutions prepared in accordance with the present invention respond to alpha, beta, and gamma radiation; electron beam radiation; x-ray; and ultraviolet radiation. However, the radiochromic solutions can be desensitized to ultraviolet radiation as will be discussed later.

As previously indicated, two types of dosimeters may be prepared in accordance with the present invention. One indicates that a threshold radiation level has been exceeded. The other provides a quantitative indication of the amount of radiation. These dosimeters are obtained by controlling the internal phase composition.

After exposing a radiation dosimeter to radiation, the resulting density of the radiochromic dye can be examined, by viewing through the microcapsule side of the dosimeter or through the support side of the dosimeter if the support is transparent, to determine the amount of radiation received.

Those skilled in the art will appreciate that it is also possible to design dosimeters in which the amount of radiation is indicated by the color or shade of the chromophoric structure formed. For example, a dosimeter can be prepared in which the layer of microcapsules includes a mixture of two or more sets of microcapsules containing different radiochromic dyes. If the coating composition includes a uniform mixture of these two types of microcapsules, the color produced will vary in both shade and color as a function of the amount of radiation received.

Shade or color differences can also be achieved by blending mixtures of microcapsules containing different radiochromic dyes and different solvents. If one microcapsule is more sensitive than another, a shade or color difference will result which is dependent on the amount of radiation.

The dosimeters of the present invention are useful in a wide variety of applications; however, two applications, in which they find particular use, are food irradiation mapping and dose mapping in diagnostic applications.

In order to determine the amount of radiation received, the dosimeter will typically be accompanied by a standard, comparison, or reference strip. If the dosimeter is a threshold type unit, this strip may be unnecessary. Radiation exceeding the threshold limit will typically be indicated by disappearance or appearance of a reference color.

In quantitative or analog dosimeters, some form of standard, comparison, or reference will be necessary. This reference may be separate from or integral with the dosimeter. Of course, the reference strip can consist of a pre-printed form displaying the density and/or color shade scale and the corresponding dosage level. Alternatively the reference strip can be formed integral with the dosimeter which can be accomplished by, for example, including markings along one border of the dosimeter indicating quantitative dosage levels and exposing the dosimeter in the border region in amounts corresponding to the markings.

In addition to visually measuring the amount of radiation received by comparing the color or shade formed, the color or shade can also be measured instrumentally by a spectrophotometer. The spectrophotometer can measure, through the transparent support of the dosimeter, the apparent transmission as a function of wavelength of the color or shade formed. Useful spectrophotometers are commercially available.

A densitometer equipped to measure the reflectance of the colored materials can also be used. A densitometer measures the reflectance through the microcapsule side of the dosimeter. As such, when using a densitometer, the support can be opaque or transparent. Useful densitometers are commercially available.

The radiochromic dyes used in the present invention are usually sensitive to ultraviolet radiation. In order to compensate for ambient light handling, a standard is typically run for comparative purposes.

As an alternative to running a standard, the radiation dosimeter can be ultraviolet radiation desensitized. For example, the internal phase of the microcapsules can be modified to include a solvent which is highly absorbing in the narrow ultraviolet range in which the radiochromic dyes are sensitive. In another example, the internal phase of the microcapsules can be modified to include an ultraviolet absorber which is highly absorbing in the narrow ultraviolet range in which the radiochromic dyes are sensitive.

Any solvent which absorbs ultraviolet radiation in the narrow range in which the radiochromic dyes are sensitive, is capable of dissolving adequate amounts of the radiochromic dye, and is non-toxic can be used in the foregoing ultraviolet light desensitization application. If the solvent does not meet all of the preceding criteria, the solvent can be modified to be useful in the foregoing application. For example, if a solvent is not ultraviolet absorbing over the entire range in which the radiochromic dyes are sensitive, appropriate ultraviolet absorbers can be use in conjunction with the solvent in order to provide an ultraviolet light desensitized radiation dosimeter.

An example of an ultraviolet radiation desensitized liquid to be microencapsulated is 57.0 wt % propylene carbonate; 38.0 wt % diethyl phthalate; and 5.0 wt % fuchsin-cyan dye. Although not ultraviolet absorbing, propylene carbonate has a high dissolution affinity for the dye. Fuchsin-cyan dye is sensitive in the 290 to 350 nm wavelength range as well as to nuclear radiation. Diethyl phthalate is ultraviolet absorbing in the 250 to 340 nm wavelength range, and as such, absorbs in all but 10 nm of the ultraviolet range in which the radiochromic dye is sensitive.

In lieu of an ultraviolet absorbing solvent, appropriate ultraviolet absorbers could be included in the solvent of the microcapsule internal phase and/or in the binder if one is used.

The radiation dosimeter of the present invention is also useful as an electron beam imaging material. For example, the dosimeter can be image-wise exposed to radiation to produce an image in the form of a color change in the radiochromic dyes.

The present invention is more fully illustrated by the following non-limiting Example.

EXAMPLE

The microencapsulation procedure was as follows. 353.0 g Distilled Water and 7.0 g Versa TL-500 were stirred for 15 min at 500 rpm. 8.0 g Pectin and 0.16 g NaHCO$_3$ were stirred for 2 hr. at 2000 rpm. The melamine-formaldehyde condensate was prepared as follows. 10.86 g Melamine with 122.22 g water was stirred. 18.03 g 37% Formaldehyde was added. The pH was adjusted to 8.5 with 10% NaOH. The solution was heated to 60° C. After the solution cleared, the solution was heated an additional 40 minutes at 60° C. The solution was cooled to 30° C. which took approximately 30 min. The water phase was pH adjusted to 6.0 with NaOH. The following internal phase was emulsified for 15 min. at 3000 rpm: 38.04 g Diethyl Phthalate; 57.12 g Propylene Carbonate; 5.02 g New Fuchsin-CN; and 6.77 g N-100 (Isocyanate). The internal phase was heated at 60° C. until the dye dissolved. The melamine-formaldehyde condensate was added and cured for 1 hr. at 70° C. and 3000 rpm. 46.2 g of 50% urea solution was added and cured for 1 hr. more at 70° C. and 3000 rpm. The solution was cooled and stirred overnight at 500 rpm.

The microcapsules were prepared as follows. A 50/50 weight water/capsule composition was centrifuged on ½ speed at 1000 rmp for 10 minutes. The liquid was decanted. The following coating solution was prepared: 50 wt % centrifuged solids; and 50 wt % Union Carbide's vehicle 443 binder. The coating solution was mixed well for approximately 10 minutes.

A film was prepared as follows. Hand draw downs were prepared with a #40 Meier bar. Specifically, a Kindura FPG 150 (78#) was coated three times (326.4 microns or 12.85 mils coating thickness) with the composition prepared above. The coatings were partially dried by an air gun followed by complete air drying.

Radiation testing occurred as follows.

| Cobalt Source - Gamma Irradiation | |
|---|---|
| Dose, Mrad | Color Density |
| 0 | 0.11 |
| 1.76 | 0.15 |
| 2.98 | 0.22 |

Color densities may be increased or even decreased for these same dose points by varying dye composition, the type of dye used, or the type(s) of solvents(s) used in the internal phase. Dye activators have previously been found to also increase color density. An example is the inclusion of 2-Imidazoline and Citric Acid in 5 wt % or less quantities.

Having described the invention in detail and by reference to preferred embodiments thereof, it will be apparent that modifications and variations are possible without departing from the scope of the invention defined in the appended claims.

What is claimed is:

1. A radiation dosimeter comprising a support having a layer of microcapsules on the surface thereof, said microcapsules comprising a wall and an internal phase, said internal phase comprisinq a solution of a radiochromic dye, said radiochromic dye solution being capable of changing color or shade plus density upon exposure to gamma, ultraviolet or electron beam radiation.

2. The dosimeter of claim 1 wherein said dosimeter indicates that a threshold level of radiation has been exceeded.

3. The dosimeter of claim 1 wherein said dosimeter provides a quantitative indication of the amount of radiation to which said dosimeter is exposed.

4. The dosimeter of claim 1 wherein said radiochromic dye is dye cyanide.

5. The dosimeter of claim 1 wherein said wall is formed from melamine-formaldehyde or urea-formaldehyde resin.

6. The dosimeter of claim 1 wherein said internal phase includes an ultraviolet absorbing solvent or an ultraviolet absorber.

7. A process for detecting and/or measuring gamma, ultraviolet or electron beam radiation comprising the steps of:
   exposing a dosimeter to radiation, said dosimeter comprising a support having a layer of microcapsules on the surface thereof, said microcapsules comprising a wall and an internal phase, said internal phase comprising a solution of a radiochromic dye, said radiochromic dye solution being capable of changing color or shade plus density upon exposure to gamma, ultraviolet or electron beam radiation; and
   comparing the color, shade, or density of said radiochromic dyes with a standard to determine the amount of gamma, ultraviolet or electron beam radiation received.

8. The process of claim 7 wherein said dosimeter indicates that a threshold level of radiation has been exceeded.

9. The process of claim 7 wherein said dosimeter provides a quantitative indication of the amount of radiation to which said dosimeter is exposed.

10. The process of claim 7 wherein said radiochromic dye is dye cyanide.

11. The process of claim 7 wherein said wall is formed from melamine-formaldelhyde of urea-formaldehyde resin.

12. The process of claim 7 wherein said internal phase includes an ultraviolet absorbing solvent or an ultraviolet absorber.

13. A process for detecting and/or measuring radiation comprising the steps of:
   exposing a radiation dosimeter to radiation, said dosimeter commmprising a transparent support having a layer of microcapsules on the surface thereof, said microcapsules comprising a wall and an internal phase, said internal phase comprising a solution of radiochromic dye, said radiochromic dye solution baing capable of changing color or shade plus density upon exposure to gamma, ultraviolet or electron beam radiation; and
   determining the amount of gamma, ultraviolet or electron beam radiation received by a spectrophotometer or a densitometer.

14. The process of claim 13 wherein said radiochromic dye is dye cyanide.

15. The process of claim 13 wherein said wall is formed from melamine-formaldehyde or urea-formaldehyde resin.

* * * * *